US012634592B2

(12) United States Patent
Emanuel et al.

(10) Patent No.: US 12,634,592 B2
(45) Date of Patent: May 19, 2026

(54) IMAGE PIXEL CROSSTALK CORRECTION

(71) Applicant: SAMSUNG ELECTRONICS CO., LTD., Suwon-si (KR)

(72) Inventors: Rivka Emanuel, Tel-Aviv (IL); Ariel Orfaig, Tel-Aviv (IL); Tzlil Ben Yehezkel, Tel-Aviv (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 107 days.

(21) Appl. No.: 18/529,583

(22) Filed: Dec. 5, 2023

(65) Prior Publication Data

US 2025/0184620 A1     Jun. 5, 2025

(51) Int. Cl.
H04N 23/84        (2023.01)
G06T 5/50         (2006.01)

(52) U.S. Cl.
CPC .............. H04N 23/84 (2023.01); G06T 5/50 (2013.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 8,736,683 B2 * | 5/2014 | Cao | ........................ | H04N 25/61 |
| | | | | 348/188 |
| 11,295,477 B1 | 4/2022 | Wang et al. | | |
| 11,533,458 B2 * | 12/2022 | Kim | ..................... | H04N 23/617 |
| 2016/0104285 A1 * | 4/2016 | Pettegrew | .............. | H04N 23/62 |
| | | | | 348/36 |
| 2019/0082168 A1 * | 3/2019 | Lee | ........................ | H04N 13/31 |
| 2022/0005168 A1 | 1/2022 | Kim et al. | | |
| 2022/0182537 A1 | 6/2022 | Kim et al. | | |
| 2025/0151978 A1 * | 5/2025 | Kato | ..................... | A61B 1/005 |

FOREIGN PATENT DOCUMENTS

| | | | | | |
|---|---|---|---|---|---|
| CN | 111323069 | | 8/2021 | | |
| CN | 115615358 | | 1/2023 | | |
| CN | 115690017 A | * | 2/2023 | | |
| WO | WO-2020024575 A1 | * | 2/2020 | ......... | G06K 9/00248 |
| WO | WO-2020203236 A1 | * | 10/2020 | ............ | G06T 5/003 |

(Continued)

OTHER PUBLICATIONS

English translation of CN-115690017-A, Chen, 2023 (Year: 2023).*

(Continued)

*Primary Examiner* — James M Hannett
(74) *Attorney, Agent, or Firm* — Morgan, Lewis & Bockius LLP

(57)        ABSTRACT

Systems and methods for image correction are provided. One aspect of the systems and methods includes obtaining first image data at a first time and second image data at a second time. Another aspect of the systems and methods includes computing calibration parameters for the second image data in real time based on the first image data. Another aspect of the systems and methods includes correcting the second image data based on the calibration parameters to obtain corrected second image data. Another aspect of the systems and methods includes generating an output image based on the corrected second image data.

19 Claims, 8 Drawing Sheets

(56) References Cited

FOREIGN PATENT DOCUMENTS

WO        2022022535        2/2022
WO        2022218438        10/2022

OTHER PUBLICATIONS

English translation of WO-2020024575-A1, Au, 2020 (Year: 2020).*
English translation of WO-2020203236-A1, Haruka, 2020 (Year: 2020).*
Dijkstra, et al., "Hyperspectral demosaicking and crosstalk correction using deep learning", In Machine Vision and Applications (2019), https://doi.org/10.1007/s00138-018-0965-4, 22 pages.
Gharbi, et al., "Deep Joint Demosaicking and Denoising", In ACM.SA '16 Technical Papers, Dec. 5-8, 2016, found on the internet at https://dl.acm.org/doi/pdf/10.1145/2980179.2982399, 12 pages.
Sung, et al., "Crosstalk Removal in Forward Scan Sonar Image Using Deep Learning for Object Detection", In IEEE Sensors Journal, vol. 00, No. 00, Jun. 2019, found on the internet at https://oasis.postech.ac.kr/bitstream/2014.oak/99857/1/2019_IEEE%20SENSORS%20JOURNAL_Minsung%20Sung_Crosstalk%20Removal%20in%20Forward%20Scan%20Sonar%20Image%20Using%20Deep%20Learning%20for%20Object%2, 15 pages.
Bogdan, et al., "DeepCalib: A Deep Learning Approach for Automatic Intrinsic Calibration of Wide Field-of-View Cameras", In European Conference on Visual Media Production, London, United Kingdom, Dec. 13-14, 2018 (CVMP '18), https://doi.org/10.1145/3278471.3278479, found on the internet at https://drive.google.com/file/d/1pZgR3wNS6Mvb87W0ixOHmEVV6tcl8d50/view, 10 pages.
Muller, et al., "Cross-Talk Compensation in Low-Cost Resistive Pressure Matrix Sensors", In IEEE International Conference on Mechatronics (ICM), 2019, found on the internet at https://www.tu-ilmenau.de/fileadmin/Bereiche/IA/neurob/Publikationen/conferences_int/2019/Mueller-ICM-2019.pdf, 7 pages.
Estribeau, et al., "Pixel crosstalk and correlation with modulation transfer function of CMOS image sensor", In Proc. SPIE 5677, Sensors and Camera Systems for Scientific and Industrial Applications VI, Mar. 7, 2005, https://doi.org/10.1117/12.588382, found on the internet at https://oatao.univ-toulouse.fr/304/1/estribeau_304.pdf, 12 pages.
Alonso-Monsalve, et al., "Graph neural network for 3D classification of ambiguities and optical crosstalk in scintillator-based neutrino detectors", In Physical Review D 103, 032005 (2021), DOI: 10.1103/PhysRevD. 103.032005, found on the internet at https://journals.aps.org/prd/pdf/10.1103/PhysRevD.103.032005, 24 pages.

* cited by examiner

105

Processor Unit
110

115

120

125

100

305

310

315

300

Obtain first image data at a first time and second image data at a second time ⟍705

Compute calibration parameters for the second image data in real time based on the first image data ⟍710

Correct the second image data based on the calibration parameters to obtain corrected second image data ⟍715

Generate an output image based on the corrected second image data ⟍720

⟍700

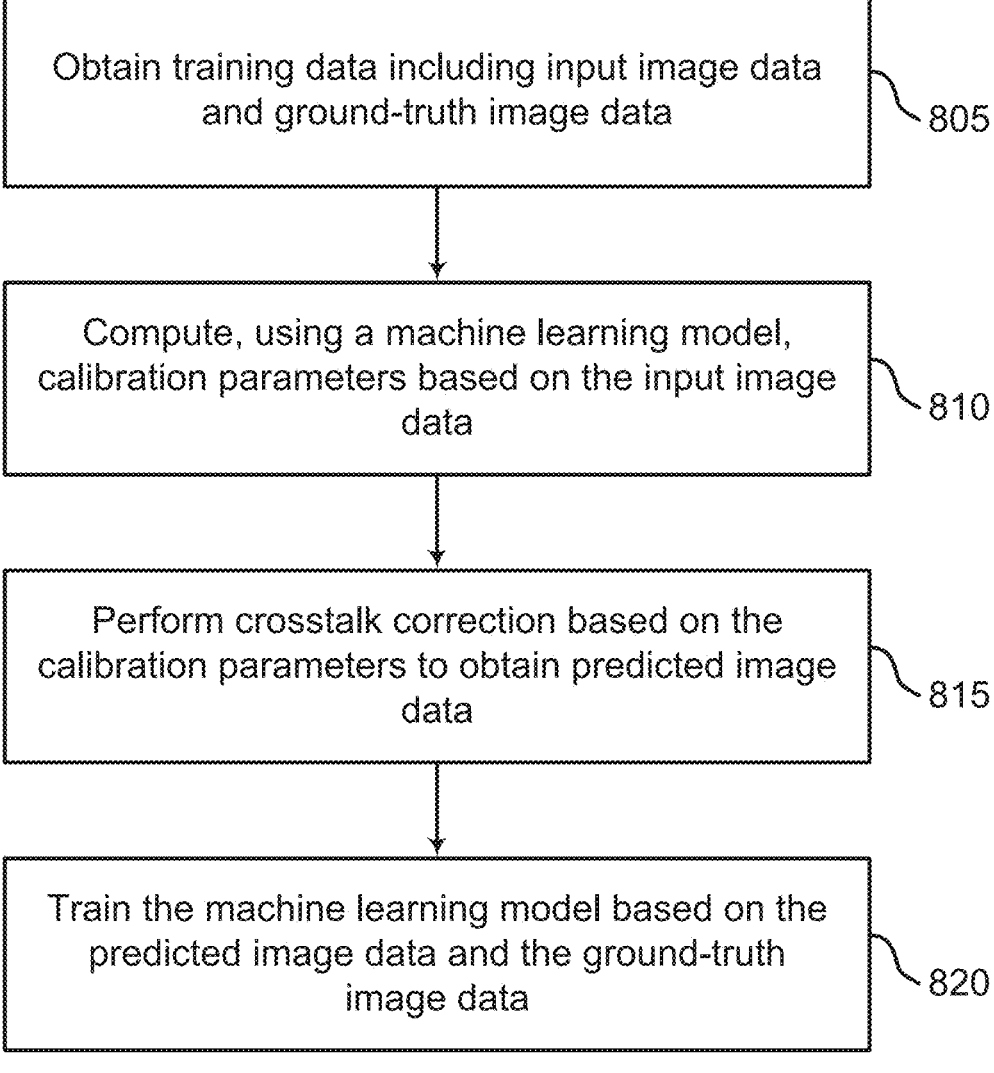

Obtain training data including input image data
and ground-truth image data
~805

Compute, using a machine learning model,
calibration parameters based on the input image
data
~810

Perform crosstalk correction based on the
calibration parameters to obtain predicted image
data
~815

Train the machine learning model based on the
predicted image data and the ground-truth
image data
~820

IMAGE PIXEL CROSSTALK CORRECTION

BACKGROUND

The following relates generally to image correction, and more specifically to image pixel crosstalk correction.

Camera technology has advanced rapidly in recent years accompanied by an increase in the use of image capture devices. Examples of image capture devices include still image cameras, moving image cameras, or other electronic devices that include cameras or image sensors. Some image capture devices (e.g., digital cameras) may use image sensors to capture images and image signal processors to process the captured images.

Image processing may generally refer to systems and techniques for editing an image (e.g., using algorithms or processing networks). Some examples of image processing techniques that may be performed on captured images include image sharpening, noise reduction, color control, image segmentation, object detection, depth estimation, and various other specialized tasks. Such image processing techniques may be implemented in various applications, such as image enhancement, image editing, robot navigation, etc.

In some examples, image processing techniques may be used to correct an image that has been distorted due to crosstalk. Crosstalk refers to the interference between one pixel of an image sensor and neighboring pixels of the image sensor. This interference may result in various issues including color bleeding, reduced image sharpness, visual artifacts (e.g., maze, teardrop, etc.), and decreased dynamic range. In some examples, techniques for mitigating or correcting crosstalk in images may be deficient, and improved image processing techniques for crosstalk correction may be desirable.

SUMMARY

The present disclosure describes systems and methods for image correction. Embodiments of the present disclosure include an image correction apparatus configured to perform crosstalk correction on image data using real-time calibration data. The image correction apparatus may compute the real-time calibration data dynamically (e.g., 'on the fly') under uncontrolled conditions, rather than statically under controlled conditions. For instance, the image correction apparatus may compute the real-time calibration data based on first image data captured in one frame, and the image correction apparatus may use the real-time calibration data to perform crosstalk correction on second image data captured in a next or subsequent frame. The image correction apparatus may then generate an output image using the corrected second image data.

A method, apparatus, non-transitory computer readable medium, and system for image correction are described. One or more aspects of the method, apparatus, non-transitory computer readable medium, and system include obtaining first image data at a first time and second image data at a second time; computing calibration parameters for the second image data in real time based on the first image data; correcting the second image data based on the calibration parameters to obtain corrected second image data; and generating an output image based on the corrected second image data.

A method, apparatus, non-transitory computer readable medium, and system for image correction are described. One or more aspects of the method, apparatus, non-transitory computer readable medium, and system include obtaining training data including input image data and ground-truth image data; computing, using a machine learning model, calibration parameters based on the input image data; performing crosstalk correction based on the calibration parameters to obtain predicted image data; and training the machine learning model based on the predicted image data and the ground-truth image data.

An apparatus, system, and method for image correction are described. One or more aspects of the apparatus, system, and method include at least one memory component; at least one processing device coupled to the at least one memory component, wherein the processing device is configured to execute instructions stored in the at least one memory component; an image sensor configured to obtain first image data at a first time and second image data at a second time; a dynamic calibration component comprising parameters stored in the at least one memory component and configured to compute calibration parameters for the second image data in real time based on the first image data; and a correction component comprising parameters stored in the at least one memory component and configured to correct the second image data based on the calibration parameters to obtain corrected second image data.

BRIEF DESCRIPTION OF THE DRAWINGS

FIGS. 7 and 8 show examples of methods for image correction according to aspects of the present disclosure.

DETAILED DESCRIPTION

Figure 1:
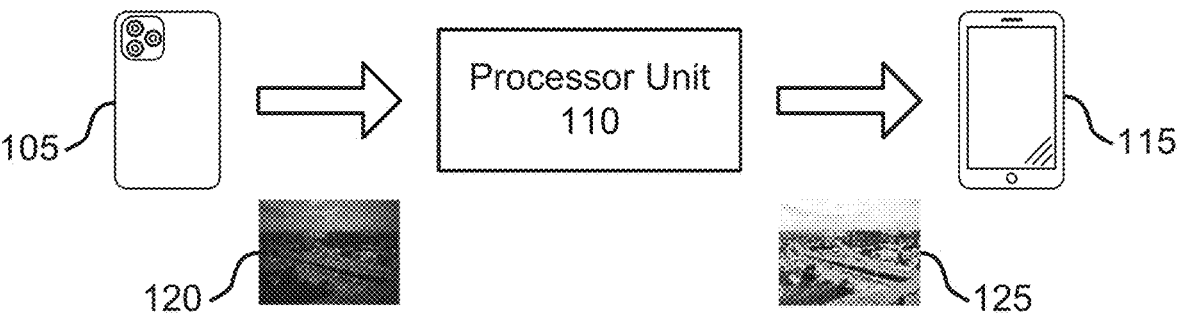
FIG. 1 shows an example of an image correction system according to aspects of the present disclosure.

The present disclosure describes systems and methods for image correction. Embodiments of the present disclosure include an image correction apparatus configured to perform crosstalk correction on image data using real-time calibration data.

Crosstalk refers to the unwanted transfer of information or signals from one image channel to another, resulting in distortion and other visual artifacts in a final image. The root causes of crosstalk may include spectral interference, optical path crossing, micro-lens misalignments, and other forms of interference. In high-resolution sensors, the arrangement of a color filter array (CFA) with adjacent pixels of the same color may exacerbate the amount of crosstalk, leading to stronger visual artifacts.

In some examples, techniques for mitigating crosstalk or minimizing the effect of crosstalk may be implemented to prevent image artifacts and improve image quality. In one example, an imaging system may be carefully designed to minimize interference between image channels. In another example, signal processing techniques may be used to remove artifacts resulting from crosstalk from a final image. An example signal processing technique may include local pixel correction combined with per-module calibrated data (e.g., calibration data for each camera model). In some cases, however, using per-module calibrated data for crosstalk correction may be expensive and time-consuming and may depend on constant manual redesign. Further, crosstalk correction using per-module calibrated data may not be effective in unpredictable lighting conditions and complex module designs.

Embodiments of the present disclosure include an image processing apparatus configured to perform high-quality crosstalk correction with limited or no dependence on per-module calibrated data. In particular, the image processing apparatus may perform crosstalk correction on image data using real-time calibration data. Real-time calibration data may refer to calibration data computed dynamically (e.g., 'on the fly') under uncontrolled conditions, rather than statically under controlled conditions. In some examples, the image correction apparatus may compute real-time calibration data based on first image data captured in a first frame, and the image correction apparatus may use the real-time calibration data to perform crosstalk correction on second image data captured in a second frame. The first frame may immediately precede the second frame in time (e.g., may be a previous frame of the second frame), and the second frame may immediately follow the first frame in time (e.g., may be a next or subsequent frame). The image correction apparatus may then generate an output image using the corrected second image data.

Because the image correction apparatus may compute calibration data for crosstalk correction in real-time rather than statically beforehand (e.g., in a controlled setting), the burden on camera makers to calibrate cameras to reduce crosstalk may be reduced, resulting in improved cost, yield, and time-to-market for new camera modules and optical structures. Additionally, the trend towards smaller pixel sizes and more complex CFA and camera module designs make crosstalk or similar interference inevitable, and improved techniques for crosstalk correction as supported by the image correction apparatus using real-time calibration data may become increasingly desirable.

As used herein, a color filter array (CFA) refers to a color filter for a sensor. For example, a high-resolution sensor may have a pattern with adjacent pixels sharing the same color filter. A channel may refer to each individual pixel type in a CFA pattern. A full image may refer to an input image with full resolution, such as an original CFA, a raw sensor-native image, or a native CFA image. A Bayer image may refer to an image based on a Bayer CFA. For example, a Bayer image may have a reduced resolution for a preview-mode. In some cases, a Bayer image may undergo an averaging function if captured on a high-resolution sensor.

Additionally, the term crosstalk may refer to the unwanted transfer of signals between neighboring pixels; a maze may refer to a visual artifact appearing in images if crosstalk is not corrected; XTC may refer to crosstalk correction; an active pixel sensor (APS) may refer to a pixel array; a module may refer to a self-contained unit that includes all components for a camera, such as an image sensor, lenses, memory, and electronics; Calibration-Base Crosstalk Correction (CXTC) may refer to a unit that applies crosstalk correction on each pixel as a function of a set of calibration parameters; and a frame may refer to an individual image or snapshot captured by a camera at a specific point in time.

Details regarding the architecture of an example image correction apparatus are provided with reference to FIGS. 1-6. An example method for image correction is provided with reference to FIG. 7. An example training process is described with reference to FIG. 8.

Network Architecture

In FIGS. 1-6, a method, apparatus, non-transitory computer-readable medium, and system for image correction are described. One or more aspects of the method, apparatus, non-transitory computer-readable medium, and system include at least one memory component; at least one processing device coupled to the at least one memory component, wherein the processing device is configured to execute instructions stored in the at least one memory component; an image sensor configured to obtain first image data at a first time and second image data at a second time; a dynamic calibration component comprising parameters stored in the at least one memory component and configured to compute calibration parameters for the second image data in real time based on the first image data; and a correction component comprising parameters stored in the at least one memory component and configured to correct the second image data based on the calibration parameters to obtain corrected second image data.

In some aspects, the method, apparatus, non-transitory computer-readable medium, and system further comprises an image processing component configured to generate an output image based on the corrected second image data.

In some aspects, the dynamic calibration component comprises a machine learning model trained to compute the calibration parameters.

In some aspects, the machine learning model comprises an encoder configured to encode the first image data to obtain an image embedding having fewer dimensions than the first image data, wherein the calibration parameters are computed based on the image embedding.

In some aspects, the dynamic calibration component comprises an additional machine learning model trained to compute additional calibration parameters based on preview input image data.

FIG. 1 shows an example of an image correction system 100 according to aspects of the present disclosure. In one aspect, image correction system 100 includes image sensor 105, processor unit 110, and image display 115. Image sensor 105 is an example of, or includes aspects of, the corresponding element described with reference to FIG. 2. Processor unit 110 is an example of, or includes aspects of, the corresponding element described with reference to FIG. 2. In some examples, the image sensor 105 and the image display 115 may be components of a same user device (e.g., smartphone, digital camera, etc.).

In the example of FIG. 1, a user may obtain (e.g., capture) an input image 120 using the image sensor 105 (e.g., camera or module). The input image 120 may be distorted or include visual artifacts due to crosstalk at the image sensor 105. The processor unit 110 may perform crosstalk correction on the input image 120 to generate an output image 125 that is displayed to the user via the image display 115. For example, the processor unit 110 may dynamically self-calibrate a crosstalk correction model using a previous image (e.g., thumbnail-sized image) from a previous frame, and the processor unit 110 may perform crosstalk correction on the input image 120 using the self-calibrated crosstalk correction model to generate the output image 125. The image correction system 100 may generate calibration parameters based on any given input image (e.g., full image, Bayer image, etc.).

In some examples, a crosstalk correction model used for crosstalk correction in the image correction system 100 may be a deep learning neural network or other neural network. The crosstalk correction model may be trained on a large dataset that includes multiple types of images (e.g., flat-field images, natural images, chart images, etc.). Additionally, a custom loss function may be developed to measure crosstalk in each pixel of the images. The use of a diverse dataset and a tailored loss function may enable accurate and effective crosstalk correction in a final model. However, in some examples a neural network is not used for the crosstalk correction model.

In some examples, image sensor 105 may refer to one or more image sensors (e.g., cameras). The image sensors may be of varying resolution, focal length, etc. (e.g., for improving zoom performance, for enhancing image quality, for leveraging physical properties of different image sensors, etc.). For instance, the image sensors may include a high-resolution image sensor (e.g., a telephoto camera), a standard image sensor (e.g., a camera), a low-resolution image sensor (e.g., a wide-angle camera), etc. In some examples, a low-resolution image may be captured using a camera with high resolution (e.g., a tele-lens camera).

Processor unit 110 comprises a processor. Processor unit 110 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 110 is configured to operate a memory array using a memory controller. In other cases, a memory controller is integrated into the processor unit 110. In some cases, the processor unit 110 is configured to execute computer-readable instructions stored in a memory to perform various functions.

Figure 2:
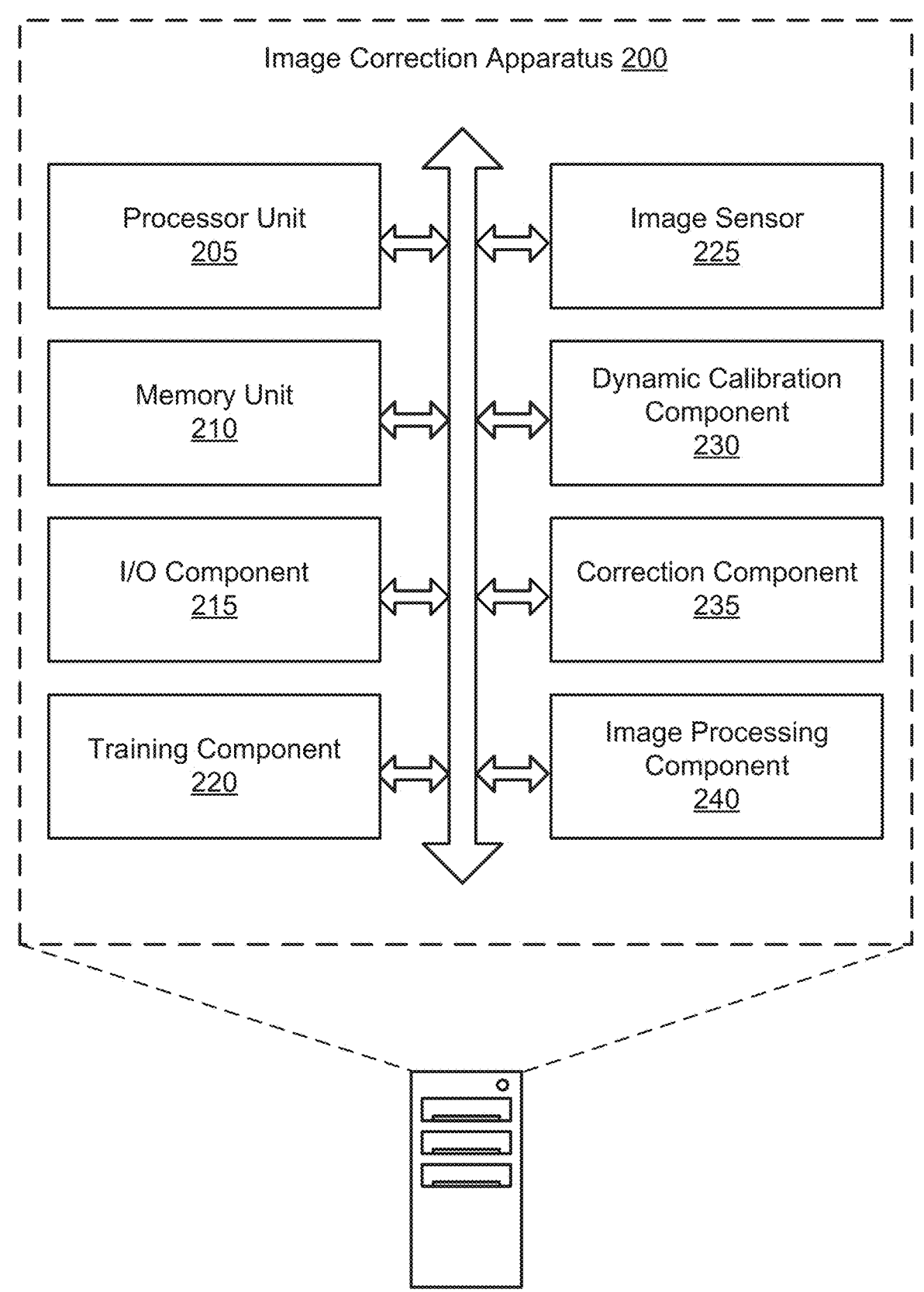
FIG. 2 shows an example of an image correction apparatus according to aspects of the present disclosure.

FIG. 2 shows an example of an image correction apparatus 200 according to aspects of the present disclosure. In one aspect, image correction apparatus 200 includes processor unit 205, memory unit 210, I/O component 215, training component 220, image sensor 225, dynamic calibration component 230, correction component 235, and image processing component 240. Processor unit 205 is an example of, or includes aspects of, the corresponding element described with reference to FIG. 1. In some embodiments, training component 220 is located outside of the image correction apparatus 200 (e.g., in a different computing device used to train the image correction apparatus 200).

Image sensor 225 is an example of, or includes aspects of, the corresponding element described with reference to FIG. 1. In some cases, one or more of the processor unit 205, memory unit 210, I/O component 215, dynamic calibration component 230, correction component 235, and image processing component 240 are located within the image sensor 225.

Memory unit 210 comprises a memory including instructions executable by the processor. Examples of a memory unit 210 include random access memory (RAM), read-only memory (ROM), or a hard disk. Examples of memory units 210 include solid state memory and a hard disk drive. In some examples, memory is used to store computer-readable, computer-executable software including instructions that, when executed, cause a processor to perform various functions described herein. In some cases, the memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 210 store information in the form of a logical state.

I/O component 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O component 215 includes a user interface. A user interface may enable a user to interact with a device. In some embodiments, the user interface may include an audio device, such as an external speaker system, an external display device such as a display screen, or an input device (e.g., remote-control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

In some examples, image correction apparatus 200 includes a computer-implemented artificial neural network (ANN) to generate classification or other prediction data for a set of samples. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

In some examples, image correction apparatus 200 includes a computer-implemented convolutional neural network (CNN). A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In some examples, the training component 220 is implemented as software stored in memory and executable by a processor of a separate computing device, as firmware in the separate computing device, as one or more hardware circuits of the separate computing device, or as a combination thereof. In some examples, training component 220 is part of another apparatus other than image correction apparatus 200 and communicates with the image correction apparatus 200. In some examples, the training component 220 may be configured to train a machine learning model of the dynamic calibration component 230.

According to some aspects, image sensor 225 obtains first image data at a first time and second image data at a second time. According to some aspects, dynamic calibration component 230 computes calibration parameters for the second image data in real time based on the first image data. According to some aspects, correction component 235 corrects the second image data based on the calibration parameters to obtain corrected second image data. According to some aspects, image processing component 240 generates an output image based on the corrected second image data.

In some aspects, the first image data and the second image data are obtained in real time from the same scene. In some aspects, the first image data includes or is limited to the preview image data. For example, when the first image is a preview, then the image is referred to as preview data.

In some examples, dynamic calibration component 230 obtains predetermined calibration data, where the calibration parameters are computed based on the predetermined calibration data. In some cases, the predetermined calibration data may be referred to as an Embedded Master. In some aspects, the calibration parameters include parameters of a function of a pixel array position. In some aspects, the calibration parameters include illumination parameters. In some aspects, the calibration parameters include crosstalk correction parameters. The dynamical calibration may include illumination data implicitly (i.e., there may be no specific illumination data that models the scene lighting explicitly).

In some examples, dynamic calibration component 230 encodes (e.g., using an encoder of a machine learning model) the first image data to obtain an image embedding having fewer dimensions than the first image data, where the calibration parameters are computed based on the image embedding.

In some aspects, the first image data has a lower resolution than the second image data.

According to some aspects, training component 220 obtains training data including input image data and ground-truth image data. According to some aspects, dynamic calibration component 230 computes, using a machine learning model, calibration parameters based on the input image data. According to some aspects, correction component 235 performs crosstalk correction based on the calibration parameters to obtain predicted image data. In some examples, training component 220 trains the machine learning model based on the predicted image data and the ground-truth image data.

In some examples, training component 220 computes a crosstalk metric based on the predicted image data and the ground-truth image data, where the machine learning model is trained based on the crosstalk metric. In some examples, training component 220 computes an image quality metric based on the predicted image data, where the machine learning model is trained based on the image quality metric.

In some examples, dynamic calibration component 230 encodes the input image data to obtain an image embedding having fewer dimensions than the input image data, where the calibration parameters are computed based on the image embedding.

In some examples, training component 220 obtains additional training data including preview input image data. In some examples, dynamic calibration component 230 computes, using an additional machine learning model, additional calibration parameters based on the preview input image data. In some examples, correction component 235 performs crosstalk correction based on the additional calibration parameters to obtain additional predicted image data. In some examples, training component 220 trains the additional machine learning model based on the additional predicted image data.

In some examples, dynamic calibration component 230 obtains predetermined calibration data, where the additional calibration parameters are computed based on the predetermined calibration data.

Figure 3:
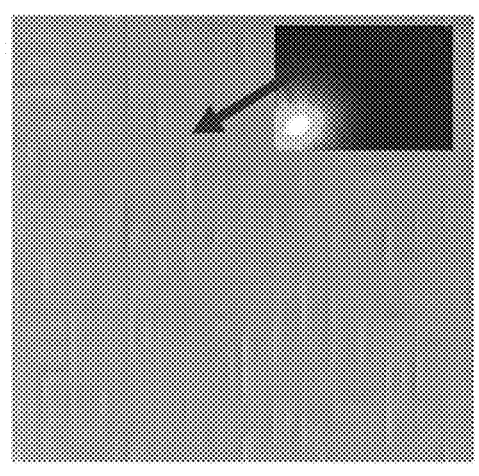
FIG. 3 shows an example of image correction according to aspects of the present disclosure.
Figure 3:
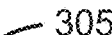
Figure 3:
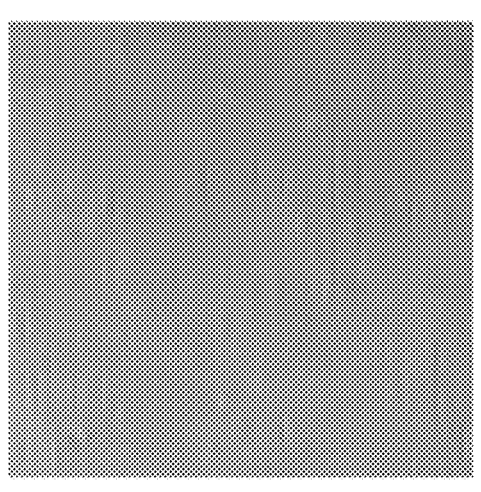
Figure 3:
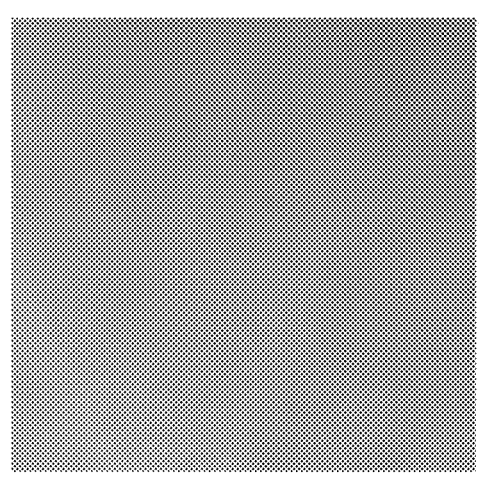

FIG. 3 shows an example of image correction 300 according to aspects of the present disclosure. A first image 305 may be corrected to generate a second image 310 or a third image 315. The first image 305 shows an uncorrected image obtained or captured by an image sensor (e.g., a zoomed in view of a portion of an image near a directed light source). The second image 310 shows a corrected version of the first image 305 generated using standard calibration correction (e.g., using per-module calibrated data). The third image 315 shows a corrected version of the first image 305 generated by performing crosstalk correction on the first image 305 using real-time calibration data (e.g., in addition to or as an alternative to per-module calibrated data). Performing crosstalk correction using real-time calibration data may preserve the performance of a standard correction procedure in terms of correcting crosstalk while also maintaining high-frequency details and accurate colors. In many challenging scenes, such as when capturing a light source directly, crosstalk correction using real-time calibration data may outperform a standard correction procedure.

Figure 4:
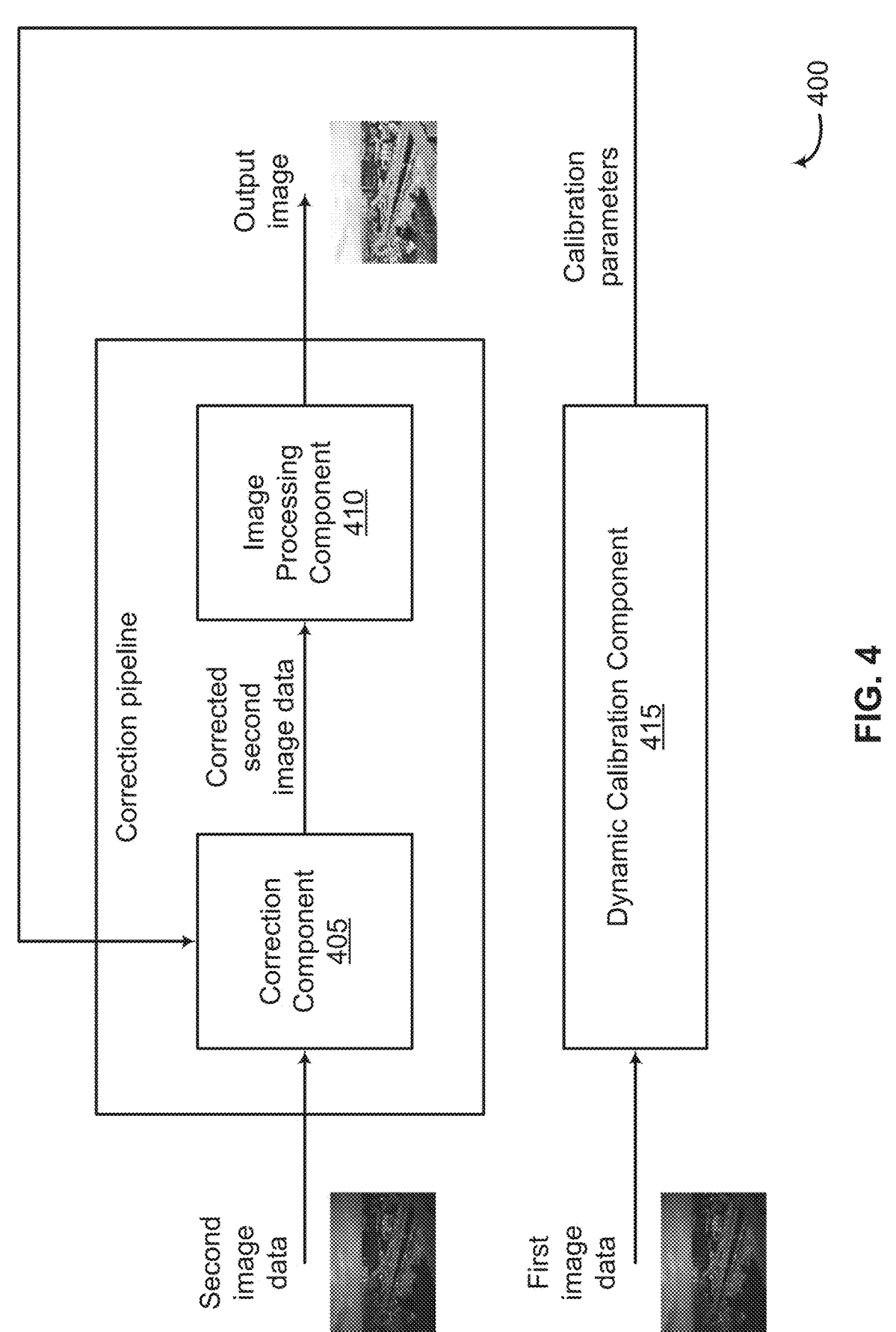
FIG. 4 shows an example of a network architecture for image correction according to aspects of the present disclosure.

FIG. 4 shows an example of a network architecture 400 for image correction according to aspects of the present disclosure. The network architecture 400 may include a correction component 405, an image processing component 410, and a dynamic calibration component 415. The dynamic calibration component 415 may take first image data (e.g., a full input image $I_t$ or a Bayer image $J_t$) as input and may output calibration parameters $\theta_t$ that are fed into a correction pipeline. The correction pipeline, including the correction component 405 and the image processing component 410, may then perform crosstalk correction and other processing on second image data (e.g., a full image in a next frame) based on the calibration parameters. Correction component 405, image processing component 410, and dynamic calibration component 415 are examples of, or include aspects of, the corresponding element described with reference to FIG. 2.

The network architecture 400 may support crosstalk correction using real-time calibration data. The crosstalk that the network architecture 400 may be designed to correct may include crosstalk that occurs between neighboring pixels of the same color, where the pixel values deviate from expectation due to interactions between the lens optics, the physical color filters, and the pixel structure. For example, a CFA pattern may have pixel disparities even when an incident signal is the same. If crosstalk is not properly compensated for, image signal processing (ISP) blocks or components (e.g., the image processing component 410) may perform poorly, resulting in color inaccuracies, desaturation, teardrop artifacts, maze patterns in flat regions, etc.

Crosstalk may be measured as the deviation from the color average in each cell, given by the following:

$$xt_i = 100\% \cdot \left( \frac{ch_i}{\frac{1}{N}\sum_{j=0,1...} ch_j} - 1 \right).$$

$ch_i$ may represent a pixel level in channel i, L may represent a number of pixels per color in a pattern; and $$\frac{1}{L}\sum_{j=0,1...} ch_j$$

may represent an average of all pixels of a same color (e.g., a Bayer image pixel level).

Crosstalk behavior may be influenced by a variety of factors, including the properties of the imaging sensor, such as the size of the pixels, the design of the color filters and micro-lenses, and the layout of the chip. The properties of an optical module, including the size and type of the lens and its assembly, may also affect crosstalk. Individual modules may have a unique impact on crosstalk, such as the position of the wafer, misalignment of the lens, and poor contact. Dynamic module properties, such as the position of the actuator and the movement of the macro lens, may also affect crosstalk.

In some examples, crosstalk behavior may depend on the parameters, features, or configurations of a module (e.g., a camera), which may be notated as module parameters, $\theta_{M,t}$, at a time t. In some examples, module parameters may be a function of a position on an APS and a channel in a CFA pattern, which may be denoted as a vector of $d_M$ parameters. Thus, the module parameters may be represented as follows:

$$\{\text{parameters of module}\}_t = \theta_{M,t} = \left(\theta_{M,1}, \theta_{M,2}, \ldots \theta_{M,d_M}\right)_t^T.$$

In other examples, crosstalk behavior may depend on the light sources in a scene, including the intensity, position, spectrum, and type of light sources in a scene. Parameters that depend on the light sources in a scene may be notated as illumination parameters, $\theta_I$, at time t. The illumination parameters may also depend on a position on an APS and a channel in a CFA pattern, which may be denoted as a vector of $d_I$ parameters. Thus, the illumination parameters may be represented as follows:

$$\{\text{parameters of illumination}\}_t = \theta_{I,t} = \left(\theta_{I,1}, \theta_{I,2}, \ldots \theta_{I,d_I}\right)_t^T.$$

The union of the module parameters and the illumination parameters may form the set of parameters (e.g., the set of all parameters) that affect crosstalk behavior. For example, the parameters affecting crosstalk behavior may be notated as $$\theta_t \triangleq \theta_{M,t} \cup \theta_{I,t} = \left(\theta_{M,1}, \theta_{M,2}, \ldots \theta_{M,d_M}, \theta_{I,1}, \theta_{I,2}, \ldots \theta_{I,d_I}\right)_t^T,$$

where the size of the joint parameters space is $d = d_I + d_M$ and $\theta_t \in \mathbb{R}^d$.

In some examples, crosstalk behavior may also be dependent on an input pixel itself and neighboring pixels surrounding the input pixel. If the incoming light of a pixel in an ideal crosstalk-free sensor is denoted as $p_t(x, y) = \mathbb{R}^{1 \times 1}$, then the actual measured intensity of a pixel on actual sensors is denoted as $I_t(x, y) = \mathbb{R}^{1 \times 1} = F(p_t(x, y)|\theta_t)$, where $F(\bullet)$ represents an unknown function that transforms $p_t$ to $I_t$. The N pixels in an entire image may then be column stacked and notated as follows: N is the number of pixels in an image, $I_t \in \mathbb{R}^N$ is an input image with crosstalk, $p_t \in \mathbb{R}^N$ is an input image of an ideal sensor, and $\theta_t \in \mathbb{R}^d$ are the module and illumination parameters.

A measured input image as a function of an ideal input image and the parameters of the module and illumination at time t is as follows: $I_t = F(p_t|\theta_t)$. Crosstalk correction may be used to estimate the actual pixel levels $\hat{p}_t$.

Some approaches for addressing crosstalk include detecting crosstalk and filtering pixel values to mitigate the effects of crosstalk. However, these approaches may work best in uniform regions of an image because there is a tradeoff between under-correction and over-aggressive smoothing, which can lead to degradation of image quality in high-resolution sensors. Calibration-based corrections (e.g., CXTC) can be used to overcome this limitation. These corrections attempt to approximate the inverse of the crosstalk behavior, allowing for high-quality correction in all regions of an image while preserving high-frequency details. The approximation of the inverse of the crosstalk behavior may be achieved by combining measured input pixel values, local neighborhood values, and calibrated parameters at a given time t to estimate an ideal pixel value. The resulting estimated pixel levels is given by the following: $\hat{p}_t = F^{-1}(I_t|\hat{\theta}_{calib}) \triangleq H(I_t|\hat{\theta}_{calib})$, where $H(\bullet)$ is a function that CXTC applies on an image.

A calibration procedure may be performed using a set of L flat-field images, such that the ideal input images $p_u$ are known: $\hat{\theta}_{calib} = S(I_{u,1}, I_{u,2} \ldots, I_{u,L}|p_{u,0}, p_{u,1}, \ldots, p_{u,L})$, where $S(\bullet)$ is a function that estimates calibration parameters. Although there may be additions to try to adapt calibration with temporal components, these additions may be ill-equipped to handle the many complexities of moving lenses and changing illuminations and the impact of these complexities on crosstalk. Thus, the calibration parameters $\hat{\theta}_{calib}$ (e.g., per-module calibration parameters) estimated at calibration parameters may be static.

In some examples, crosstalk correction using per-module calibration data may present challenges. In one example, if a module and illumination conditions (e.g., at the time of capturing an image) are similar to a calibration setting, then pixel estimation may be accurate and crosstalk correction may be successful without degradation to an image, such as resolution loss. However, if module or illumination conditions are not similar to a calibration setting, then crosstalk correction may degrade. In another example, efforts to adapt calibration parameters as a function of module settings may depend on constant manual redesign, which may be risky in new optical structures and may create unpredictable interdependencies. In another example, a calibration process may be a burden on designers and phone makers with an impact on cost, yield, and production efficiency. To minimize efficiency losses, minimal images may be allowed for calibration which may create large quality gaps.

The network architecture 400 may allow for crosstalk correction with little or no dependence on calibration for each module (e.g., per-module calibration data). However, there may be one or more challenges associated with designing the network architecture 400. In one example, it may be appropriate for an image correction apparatus to calibrate dynamically as $\theta_t$ changes over time. In another example, it may be appropriate for an image correction apparatus to calibrate when inputs are natural images and not solely flat-field as in a standard calibration procedure. In yet another example, it may be appropriate for an image correction apparatus to perform crosstalk correction in real time to correct image data before additional image processing (e.g., in an ISP pipeline).

In yet another example, it may be appropriate to allow for performing crosstalk correction at t=0 when there is no access to an input image from a previous frame. An image correction apparatus may not have access to an input image from a previous frame for still images when, for t<0, a module is operating in a preview mode. In a preview mode, an input image may be a Bayer image J(x, y) (e.g., or another image from another CFA), which is a processing of a full image with all adjacent pixels of the same color C(x, y) averaged:

$$J(x, y) = \frac{1}{dim(C(x, y))} \sum_{C(x,y)} m,j\epsilon \ I(x + n, y + j).$$

Because crosstalk may be defined as the variance between pixels in C(x, y), crosstalk information may be lost in a preview input image (e.g., due to color averaging) and thus may not be used to learn θ.

The network architecture 400 may overcome each of these challenges by supporting crosstalk correction using real-time calibration data. In some examples, a CXTC unit (e.g., a correction model) may perform crosstalk correction well enough if a scene and model state are static and may support dynamic calibration for scene and module changes. In some examples, the state of a module may change slowly between frames $|\theta_{M,t}-\theta_{M,t-\Delta}|<\delta$. For example, mechanical movements of a lens may be typically slower than a frame rate. For scenarios where a frame rate is very low or a module changes rapidly, an extra frame may be used to adapt to module changes. In some examples, scene illumination may change slowly between frames $|\theta_{I,t}-\theta_{I,t-\Delta}|<\delta$. For example, if a scene is outdoors or inside, consecutive frames are usually in a same scene. In scenarios where there is a sudden scene illumination change, an extra frame may be used to adapt. In some examples, the objects in a scene may have a negligible effect on the estimation of calibration parameters $\hat{\theta}$ such that $\forall\Delta_t<C$ s.t.$|I_t-I_{t-\Delta}|<\Delta_t\rightarrow\exists\delta<\epsilon$ s.t.$|\hat{\theta}(I_t)-\hat{\theta}(I_{t-\Delta})|<\delta$. That is, if a module state and illumination state are constant, the estimation of calibration parameters may be robust to the motion of objects in a scene or to camera movement.

The network architecture 400 may support a method to estimate calibration parameters $\hat{\theta}$ without or with little dependence on per-module calibration data. A dynamic calibration component 415 may learn calibration parameters based on an image from a previous frame without any changes to a correction pipeline including a correction component 405 and an image processing component 410. That is, the dynamic calibration component 415 may compute the calibration parameters based on an input image in accordance with the following equations:

$$\hat{\theta}_t = \begin{cases} f(J_{t-\Delta}), & t = 0 \\ g(I_{t-\Delta}), & t > 0 \end{cases},$$

where g(•) is applied to a full input image to estimate the parameters for all frames except a first frame, and f(•) is applied to a Bayer input image $J_{t<0}$ (e.g., or other preview input image) to obtain the estimate $\theta_{t=0}$.

Once the dynamic calibration component 415 computes the calibration parameters based on first image data, the calibration parameters may be fed into a correction pipeline including the correction component 405 and the image processing component 410. The correction component 405 may obtain second image data and may perform crosstalk correction on the second image data using the calibration parameters to generate corrected second image data. The image processing component 410 may then perform additional image processing on the corrected second image data to generate an output image (e.g., to be displayed via an image display as described with reference to FIG. 1). In some examples, deep learning techniques may be used to predict estimated calibration parameters $\hat{\theta}_t$ from an input image (e.g., a full image and a Bayer image).

Figure 5:
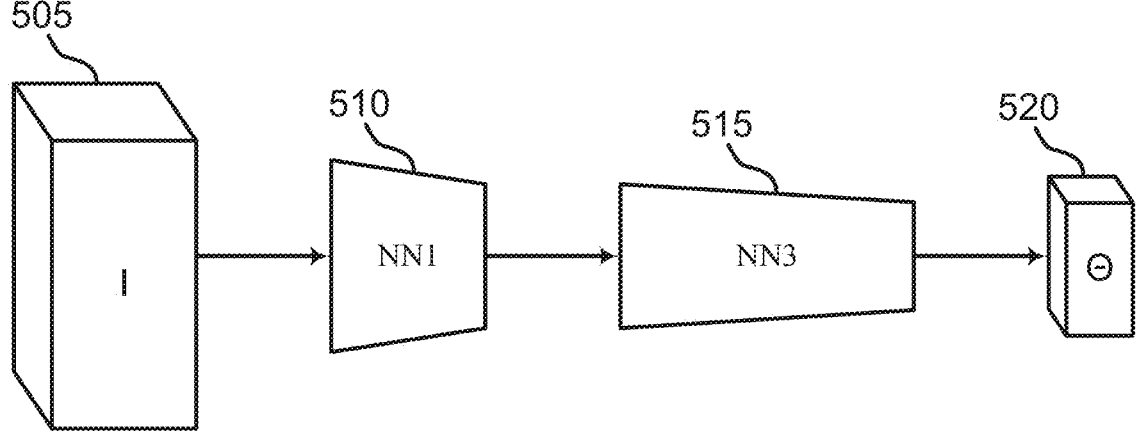
FIGS. 5 and 6 show examples of neural network architectures for image correction according to aspects of the present disclosure.
Figure 5:
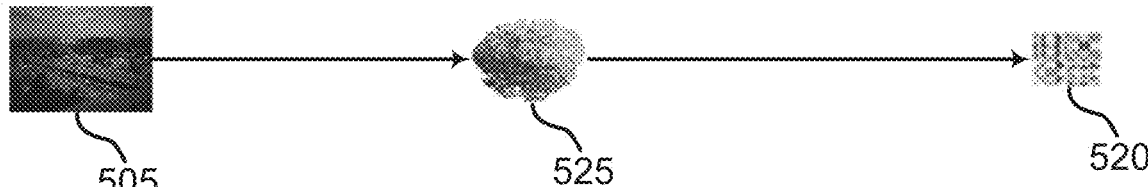

FIG. 5 shows an example of a neural network architecture 500 according to aspects of the present disclosure. The neural network architecture 500 may be an implementation of the dynamic calibration component 415 of FIG. 4. For instance, the neural network architecture may be an implementation of the function g(•) for estimating calibration parameters (e.g., via a latent space) for all frames except a first frame (e.g., at t>0). One implementation of the function g(•) may use a transformer via a smaller latent space as $dim(\hat{\theta})<<dim(I)$. An input image 505(I) may be fed into a first neural network 510 which may represent the input image 505 in a latent space 525. A second neural network 515 may then generate output calibration parameters 520 ($\hat{\theta}_t$) based on the latent representation of the input image 505 output from the first neural network 510.

Figure 6:
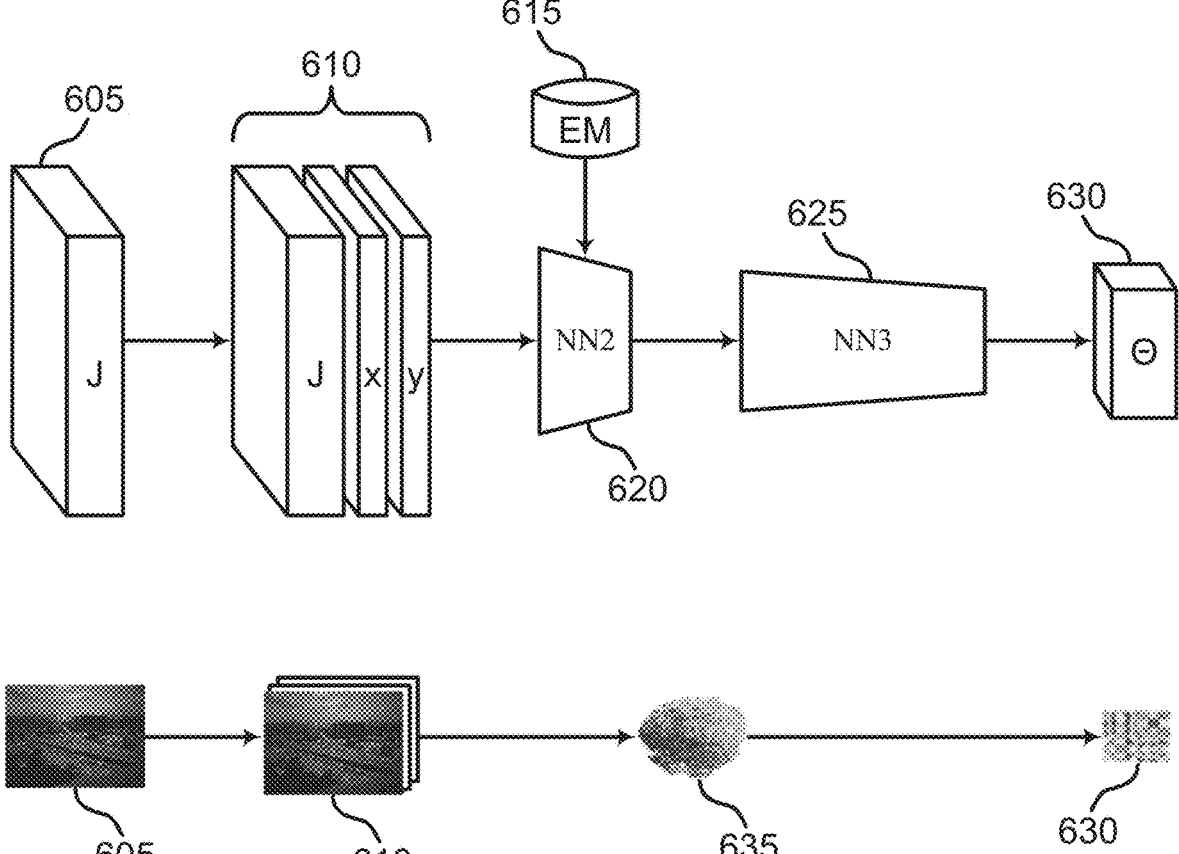

FIG. 6 shows an example of a neural network architecture 600 according to aspects of the present disclosure. The neural network architecture 600 may be a general hybrid architecture that uses a Bayer image (e.g., or other preview image) with a small amount of predetermined (e.g., global) calibrated parameters to generate calibration parameters via a latent space. The neural network architecture 600 may be used with predetermined calibration and may prioritize a first frame when computing calibration parameters.

The neural network architecture 600 may be an implementation of the dynamic calibration component 415 of FIG. 4. For instance, the neural network architecture 600 may be an implementation of the function f(•) for estimating calibration parameters for a first frame (e.g., at t=0).

One implementation of the function f(•) may use a different encoder to map an input to a same latent space as the function g(•). To improve the performance of the encoder, the encoder may be provided with two forms of input: embedded x and y coordinates to help the encoder learn the spatial elements of the input and predetermined calibration data (e.g., per-module calibration data or previously computed real-time calibration data, denoted as an embedded master (EM)). These inputs may help the encoder to learn the relationship between a Bayer image (e.g., or another preview image) and a full image. The x and y coordinates may be concatenated on the input image 605 (J) to generate input image data 610. The input image data 610 may then be fed into a first neural network 620 which may represent the input image 605 in a latent space 635 based on the input image data 610 and the EM 615. A second neural network 625 may then generate output calibration parameters 630 ($\hat{\theta}_t$) based on the latent representation of the input image 605 output from the first neural network 620.

In some examples, a training architecture may be established for training the neural network architecture 500 of FIG. 5 or the neural network architecture 600 of FIG. 6. An image database may be built by capturing natural and chart images with a set of cameras. For the loss to train $g(I_t)$, a differentiable proxy for the CXTC may be created: $\hat{p}_{train}=\text{Prox}_H(I_t|g(I_t))$ such that $\forall I_t \rightarrow |H(I_t|g(I_t)-\text{Prox}_H(I_t|g(I_t))|<\delta$. The loss may then be calculated using a crosstalk metric calculated on $\hat{p}_{train}$ with the gradients obtained through backpropagating through the network and the CXTC proxy, as given by: $\mathcal{L}_{xt}=\text{XT}(\text{Prox}_H(I_t|g(I_t)))$. Additionally, a series of losses may be added to measure image quality (IQ) calculated on the output after a differentiable proxy of ISP processing, as given by: $\mathcal{L}_{IQ,i}=\text{IQ}_i(\text{Prox}_{ISP}(\text{Prox}_H(I_t|g(I_t))))$. Thus, the total loss with an L1 regularization on the parameter size may be given by: $\text{Loss}=\mathcal{L}_{xt}+\Sigma_i\lambda_i\mathcal{L}_{IQ,i}+\lambda_r|\theta|$. The gradients may be obtained through backpropagating through the differentiable approximations of the CXTC and ISP. The weights may first be found for $g(I_t)$ and then after for $f(J_t)$. Additionally, or alternatively, training for $g(I_t)$ and $f(J_t)$ may be done jointly or in tandem. The EM 615 may then be found by training on a specific sensor.

Image Correction Process

Figure 7:
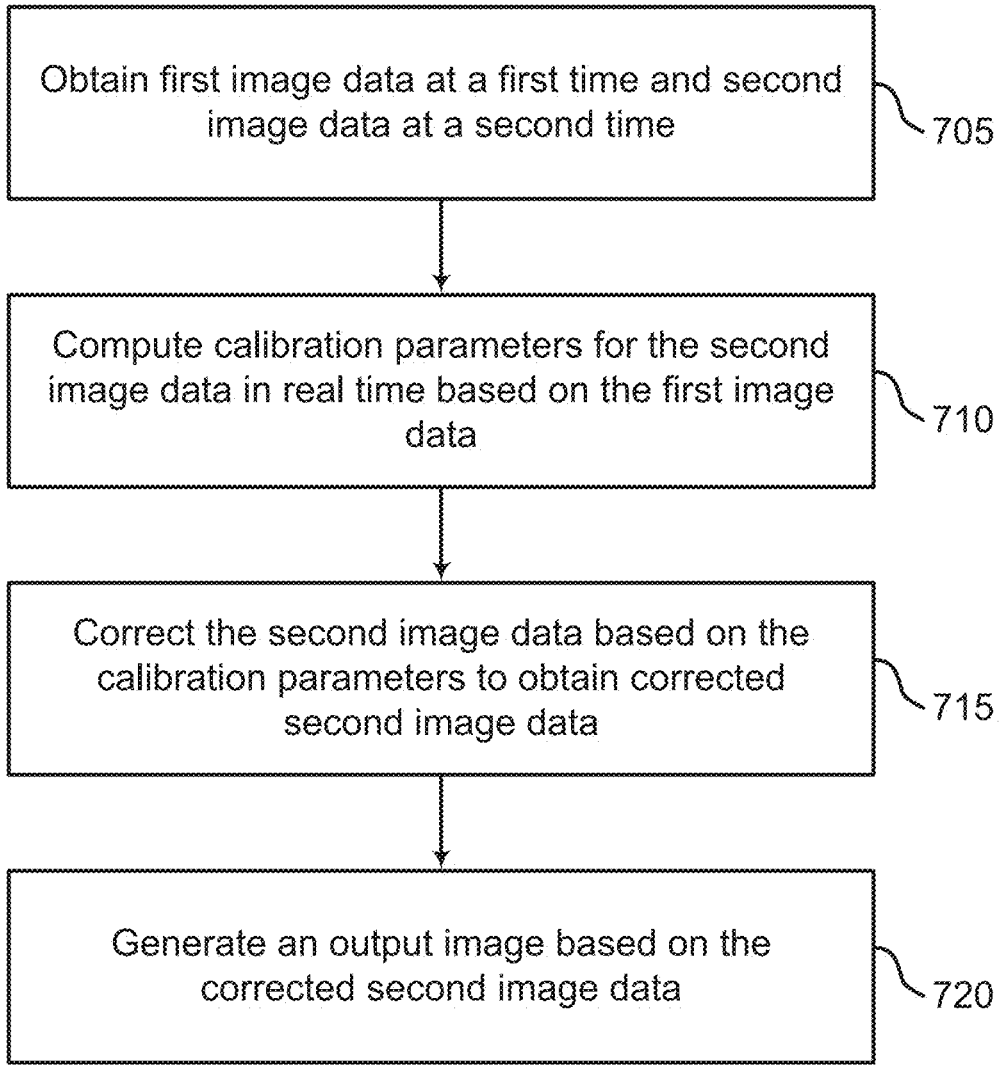

In FIG. 7, a method, apparatus, non-transitory computer-readable medium, and system for image correction are described. One or more aspects of the method, apparatus, non-transitory computer-readable medium, and system include obtaining first image data at a first time and second image data at a second time; computing calibration parameters for the second image data in real time based on the first image data; correcting the second image data based on the calibration parameters to obtain corrected second image data; and generating an output image based on the corrected second image data.

In some aspects, the first image data and the second image data are obtained in real time from a same scene.

In some aspects, the first image data comprises preview image data.

Some examples of the method, apparatus, non-transitory computer readable medium, and system further include obtaining predetermined calibration data, wherein the calibration parameters are computed based on the predetermined calibration data.

In some aspects, the calibration parameters comprise parameters of a function of a pixel array position.

In some aspects, the calibration parameters comprise illumination parameters.

In some aspects, the calibration parameters comprise crosstalk correction parameters.

Some examples of the method, apparatus, non-transitory computer readable medium, and system further include encoding the first image data to obtain an image embedding having fewer dimensions than the first image data, wherein the calibration parameters are computed based on the image embedding.

In some aspects, the first image data has a lower resolution than the second image data.

FIG. 7 shows an example of a method 700 for image correction according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system obtains first image data at a first time and second image data at a second time. The first time at which the first image data is obtained may correspond to a first frame, and the second time at which the second image data is obtained may correspond to a second frame. The first frame may immediately precede the second frame, and the second frame may immediately follow the first frame. Thus, the first image data and the second image data may be obtained in real time from a same scene. For instance, the first image data and the second image data may include similar objects or a similar setting and may be captured under similar conditions within a threshold time of each other. In some cases, the operations of this step refer to, or may be performed by, an image sensor as described with reference to FIGS. 1 and 2.

At operation 710, the system computes calibration parameters for the second image data in real time based on the first image data. The calibration parameters computed in real time may be computed from the first image data (e.g., rather than static module parameters and illumination conditions) and may be referred to as real-time calibration data. Real-time calibration data may be computed based on unpredictable or uncontrolled conditions, as opposed to per-module calibration data which may be computed in predetermined conditions or controlled settings using specific scenes or kinds of images. In some cases, the operations of this step refer to, or may be performed by, a dynamic calibration component as described with reference to FIG. 2.

At operation 715, the system corrects the second image data based on the calibration parameters to obtain corrected second image data. The correction of the second image data may be referred to as crosstalk correction, and the crosstalk correction may improve all regions of an image while maintaining high-frequency details and accurate colors. In some cases, the operations of this step refer to, or may be performed by, a correction component as described with reference to FIG. 2.

At operation 720, the system generates an output image based on the corrected second image data. Because crosstalk correction may be performed on the second image data to generate the corrected second image data, the output image may be less distorted and may include fewer visual artifacts. In some cases, the operations of this step refer to, or may be performed by, an image processing component as described with reference to FIG. 2.

Training

In FIG. 8, a method, apparatus, non-transitory computer-readable medium, and system for image correction are described. One or more aspects of the method, apparatus, non-transitory computer-readable medium, and system include obtaining training data including input image data and ground-truth image data; computing, using a machine learning model, calibration parameters based on the input image data; performing crosstalk correction based on the calibration parameters to obtain predicted image data; and training the machine learning model based on the predicted image data and the ground-truth image data.

Some examples of the method, apparatus, non-transitory computer readable medium, and system further include computing a crosstalk metric based on the predicted image data and the ground-truth image data, wherein the machine learning model is trained based on the crosstalk metric.

Some examples of the method, apparatus, non-transitory computer readable medium, and system further include computing an image quality metric based on the predicted image data, wherein the machine learning model is trained based on the image quality metric.

Some examples of the method, apparatus, non-transitory computer readable medium, and system further include encoding the input image data to obtain an image embedding having fewer dimensions than the input image data, wherein the calibration parameters are computed based on the image embedding.

Some examples of the method, apparatus, non-transitory computer readable medium, and system further include obtaining additional training data including preview input image data. Some examples further include computing, using an additional machine learning model, additional calibration parameters based on the preview input image data. Some examples further include performing crosstalk correction based on the additional calibration parameters to obtain additional predicted image data. Some examples further include training the additional machine learning model based on the additional predicted image data.

Some examples of the method, apparatus, non-transitory computer readable medium, and system further include obtaining predetermined calibration data, wherein the additional calibration parameters are computed based on the predetermined calibration data.

FIG. 8 shows an example of a method 800 for image correction according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system obtains training data including input image data and ground-truth image data. The input image data may include input images, and the ground-truth image data may include ground-truth crosstalk corrected image data or ground-truth output images. In some cases, the operations of this step refer to, or may be performed by, a training component as described with reference to FIG. 2.

At operation 810, the system computes, using a machine learning model, calibration parameters based on the input image data. The machine learning model may compute the calibration parameters for a crosstalk correction pipeline (e.g., a differential proxy for the CXTC) to use to perform crosstalk correction. In some cases, the operations of this step refer to, or may be performed by, a dynamic calibration component as described with reference to FIG. 2.

At operation 815, the system performs crosstalk correction based on the calibration parameters to obtain predicted image data. The crosstalk correction may generate corrected image data which may be used for training or which may be used to generate an output image for training. In some cases, the operations of this step refer to, or may be performed by, a correction component as described with reference to FIG. 2.

At operation 820, the system trains the machine learning model based on the predicted image data and the ground-truth image data. The predicted image data may include crosstalk corrected image data or crosstalk corrected output images which may be compared to ground-truth crosstalk corrected image data or ground-truth crosstalk corrected output images to train the machine learning model. In some cases, the operations of this step refer to, or may be performed by, a training component as described with reference to FIG. 2.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining first image data at a first time and second image data at a second time;

computing, using a machine learning model, calibration parameters for the second image data in real time based on the first image data;

correcting for crosstalk the second image data based on the calibration parameters to obtain a corrected second image data; and generating an output image based on the corrected second image data, wherein crosstalk is indicative of unwanted transfer of image information from a first image channel to a second image channel, and wherein the machine learning model is trained based on a crosstalk metric that is computed based on predicted image data and ground-truth image data.

2. The method of claim 1, wherein:

the first image data and the second image data are obtained in real time from a same scene.

3. The method of claim 1, wherein:

the first image data comprises preview image data.

4. The method of claim 3, further comprising:

obtaining predetermined calibration data, wherein the calibration parameters are computed based on the predetermined calibration data.

5. The method of claim 1, wherein:

the calibration parameters comprise parameters of a function of a pixel array position.

6. The method of claim 1, wherein:

the calibration parameters comprise illumination parameters.

7. The method of claim 1, wherein:

the calibration parameters comprise crosstalk correction parameters.

8. The method of claim 1, further comprising:

encoding the first image data to obtain an image embedding having fewer dimensions than the first image data, wherein the calibration parameters are computed based on the image embedding.

9. The method of claim 1, wherein:

the first image data has a lower resolution than the second image data.

10. A method comprising:

obtaining training data including input image data and ground-truth image data;

computing, using a machine learning model, calibration parameters based on the input image data;

performing crosstalk correction based on the calibration parameters to obtain predicted image data;

training the machine learning model based on the predicted image data and the ground-truth image data; and computing a crosstalk metric based on the predicted image data and the ground-truth image data, wherein the machine learning model is trained based on the crosstalk metric.

11. The method of claim 10, further comprising:

computing an image quality metric based on the predicted image data, wherein the machine learning model is trained based on the image quality metric.

12. The method of claim 10, further comprising:

encoding the input image data to obtain an image embedding having fewer dimensions than the input image data, wherein the calibration parameters are computed based on the image embedding.

13. The method of claim 10, further comprising:

obtaining additional training data including preview input image data;

computing, using an additional machine learning model, additional calibration parameters based on the preview input image data;

performing crosstalk correction based on the additional calibration parameters to obtain additional predicted image data; and training the additional machine learning model based on the additional predicted image data.

14. The method of claim 13, further comprising:

obtaining predetermined calibration data, wherein the additional calibration parameters are computed based on the predetermined calibration data.

15. An apparatus comprising:

at least one memory component;

at least one processing device coupled to the at least one memory component, wherein the processing device is configured to execute instructions stored in the at least one memory component;

an image sensor configured to obtain first image data at a first time and second image data at a second time;

a dynamic calibration component comprising parameters stored in the at least one memory component and configured to compute, using a machine learning model, calibration parameters for the second image data in real time based on the first image data; and a correction component comprising parameters stored in the at least one memory component and configured to correct for crosstalk the second image data based on the calibration parameters to obtain corrected second image data, wherein crosstalk is indicative of unwanted transfer of image information from a first image channel to a second image channel, and wherein the machine learning model is trained based on a crosstalk metric that is computed based on predicted image data and ground-truth image data.

16. The apparatus of claim 15, wherein the apparatus further comprises an image processing component configured to generate an output image based on the corrected second image data.

17. The apparatus of claim 15, wherein the dynamic calibration component comprises a machine learning model trained to compute the calibration parameters.

18. The apparatus of claim 17, wherein the machine learning model comprises an encoder configured to encode the first image data to obtain an image embedding having fewer dimensions than the first image data, wherein the calibration parameters are computed based on the image embedding.

19. The apparatus of claim 15, wherein the dynamic calibration component comprises an additional machine learning model trained to compute additional calibration parameters based on preview input image data.

* * * * *